(12) United States Patent
Brown et al.

(10) Patent No.: US 8,289,734 B2
(45) Date of Patent: Oct. 16, 2012

(54) OUTPUT APPARATUS TO OUTPUT A VITAL OUTPUT FROM TWO SOURCES

(75) Inventors: James P. Brown, Allison Park, PA (US); John E. Lemonovich, South Fayette, PA (US); James C. Werner, Oakmont, PA (US); William J. Moltz, Pittsburgh, PA (US); Lawrence A. Weber, Allison Park, PA (US); William A. Sharp, Cranberry Township, PA (US)

(73) Assignee: Ansaldo STS USA, Inc., Pittsburgh, PA (US)

( * ) Notice: Subject to any disclaimer, the term of this patent is extended or adjusted under 35 U.S.C. 154(b) by 425 days.

(21) Appl. No.: 12/579,446

(22) Filed: Oct. 15, 2009

(65) Prior Publication Data

US 2011/0090714 A1    Apr. 21, 2011

(51) Int. Cl.
*H02M 3/337* (2006.01)
*G06F 11/00* (2006.01)

(52) U.S. Cl. .................. 363/24; 714/12; 246/219
(58) Field of Classification Search .......... 363/24, 363/26; 246/219; 714/11, 12, 14, 31, E11.152, 714/E11.161, E11.163
See application file for complete search history.

(56) References Cited

U.S. PATENT DOCUMENTS

| | | | |
|---|---|---|---|
| 4,611,291 A * | 9/1986 | Hoelscher | 702/57 |
| 4,622,667 A * | 11/1986 | Yount | 714/11 |
| 4,740,972 A * | 4/1988 | Rutherford, Jr. | 714/807 |
| 4,763,236 A | 8/1988 | Usui | |
| 4,885,675 A | 12/1989 | Henze et al. | |
| 4,903,182 A | 2/1990 | Pilukaitis et al. | |
| 5,295,058 A | 3/1994 | McGreevy | |
| 5,301,906 A | 4/1994 | Bodnar, II | |
| 5,317,496 A | 5/1994 | Seiersen | |
| 5,343,378 A | 8/1994 | Tohya | |
| 5,412,555 A | 5/1995 | Uramoto | |
| 5,561,762 A | 10/1996 | Smith et al. | |
| 5,768,368 A | 6/1998 | Koenig et al. | |
| 6,108,220 A | 8/2000 | Franke | |
| 6,130,386 A | 10/2000 | Jorczak | |
| 6,236,579 B1 | 5/2001 | Watanabe et al. | |
| 6,457,682 B2 * | 10/2002 | Anderson et al. | 246/292 |

(Continued)

FOREIGN PATENT DOCUMENTS

JP       60-183971 A       9/1985

(Continued)

*Primary Examiner* — Harry Behm
(74) *Attorney, Agent, or Firm* — Eckert Seamans Cherin & Mellott, LLC; Kirk D. Houser

(57) ABSTRACT

An output apparatus includes a first source of a first signal having a first state or a different second state; a second source of a second signal having a first state or a different second state; and a circuit structured to output a vital output including a first state when the first state of the first signal corresponds to the first state of the second signal and, otherwise, including a different second state. At least one of the first signal and the second signal is a static signal. The other one of the first signal having the first state and the second signal having the first state is a dynamic signal. When at least one of the first signal has the different second state of the first signal and the second signal has the different second state of the second signal, the vital output includes the different second state.

16 Claims, 3 Drawing Sheets

U.S. PATENT DOCUMENTS

| | | |
|---|---|---|
| 6,486,418 B1 | 11/2002 | Jorczak |
| 6,674,654 B2 | 1/2004 | Winick et al. |
| 6,693,804 B2 | 2/2004 | Suzuki |
| 6,787,717 B2 | 9/2004 | Jorczak |
| 7,176,651 B2 * | 2/2007 | Kifuku et al. ............. 318/801 |
| 7,453,216 B2 | 11/2008 | Ushijima |
| 7,583,244 B2 | 9/2009 | Werner et al. |
| 7,877,627 B1 * | 1/2011 | Freydel .................... 714/11 |
| 2002/0181250 A1 | 12/2002 | Riggio et al. |
| 2003/0002233 A1 | 1/2003 | Usui |
| 2004/0233685 A1 | 11/2004 | Matsuo et al. |
| 2006/0190157 A1 * | 8/2006 | Fenske et al. ............. 701/70 |
| 2008/0125886 A1 * | 5/2008 | King et al. ................ 700/82 |

FOREIGN PATENT DOCUMENTS

WO  WO 2008119870 A1 * 10/2008

* cited by examiner

OUTPUT APPARATUS TO OUTPUT A VITAL OUTPUT FROM TWO SOURCES

BACKGROUND

1. Field

The disclosed concept pertains generally to output apparatus and, more particularly, to such output apparatus to output a vital output.

2. Background Information

Vital control systems using multiple processors need a mechanism to vitally control single point logical outputs. This means that two vital processors need to independently force a vital output state to the most restrictive state regardless of the operation of the other vital processor. Therefore, both vital processors need to agree to put the vital output into the least restrictive state.

Both vital processors need to be able to monitor and verify the current vital output state.

Output control and monitoring circuits can fail so both vital processors need to be able to frequently verify that they can correctly detect the vital output state and independently force an output in the least restrictive state to the most restrictive state. Any single point failure of the circuit either needs to be detectable or force the vital output to the most restrictive state. Ideally, the verification functions should be done without changing the state of the vital output.

In the event that either or both vital processors cease to execute their control programs, then the vital output needs to switch to the most restrictive state.

There is room for improvement in output apparatus to output a vital output.

SUMMARY

These needs and others are met by embodiments of the disclosed concept, which provide an improved output apparatus including a circuit to output a vital output including a first state when a first state of a first signal from a first source corresponds to a first state of a second signal from a second source and, otherwise, including a different second state, wherein at least one of the first signal and the second signal is a static signal, wherein the other one of the first signal having the first state and the second signal having the first state is a dynamic signal, and wherein when at least one of the first signal has the different second state of the first signal and the second signal has the different second state of the second signal, the vital output includes the different second state of the vital output.

In accordance with an aspect of the disclosed concept, an output apparatus comprises: a first source of a first signal having a first state or a different second state; a second source of a second signal having a first state or a different second state; and a circuit structured to output a vital output including a first state when the first state of the first signal corresponds to the first state of the second signal and, otherwise, including a different second state, wherein at least one of the first signal and the second signal is a static signal, wherein the other one of the first signal having the first state and the second signal having the first state is a dynamic signal, and wherein when at least one of the first signal has the different second state of the first signal and the second signal has the different second state of the second signal, the vital output includes the different second state of the vital output.

The circuit may comprise an alternating current to direct current converter structured to output the vital output including the first state as an energized direct current signal responsive to the first state of the first signal being an energized direct current signal and the first state of the second signal being two dynamic signals of opposite phase.

The alternating current to direct current converter may comprise a transformer including a primary winding having a center tap and two ends, and a secondary winding, and a rectifier cooperating with the secondary winding; the energized direct current signal of the first state of the first signal may be structured to energize the center tap; the two dynamic signals of opposite phase may be coupled to the two ends of the primary winding; and the secondary winding may apply an alternating current signal to the rectifier to provide the energized direct current signal of the first state of the vital output.

The alternating current to direct current converter may further comprise a switch controlled by the energized direct current signal of the first state of the first signal, the switch being closed responsive to the last such energized direct current signal to couple a direct current voltage to the center tap, the switch being open responsive to the different second state of the first signal being a non-energized direct current signal.

The alternating current to direct current converter may further comprise two switches structured to electrically connect the two ends of the primary winding to a common; the two dynamic signals of opposite phase may be coupled to the two ends of the primary winding; and when the energized direct current signal of the first state of the first signal energizes the center tap, the two dynamic signals of opposite phase may alternately close the two switches to cause the secondary winding to apply the alternating current signal to the rectifier to provide the energized direct current signal of the first state of the vital output.

The first source may comprise a first processor; the second source may comprise a second processor; and both of the first and second processors may be structured to monitor the two ends of the primary winding.

The rectifier may include two output nodes defining the energized direct current signal of the first state of the vital output and a capacitor disposed between the two output nodes; and both of the first and second processors may be structured to independently test the first and different second states of the vital output.

One of the first and second processors may be structured to cause the different second state of the vital output for a predetermined time; and the capacitor of the rectifier may be structured to maintain the first state of the vital output for greater than the predetermined time.

The circuit may comprise an alternating current to direct current converter structured to output the vital output including the first state as an energized and isolated direct current signal responsive to the first state of the first signal being an energized direct current signal and the first state of the second signal being two dynamic signals of opposite phase, and, otherwise, to output the vital output including the different second state as a non-energized and isolated direct current signal.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

As employed herein, the term "number" shall mean one or an integer greater than one (i.e., a plurality).

As employed herein, the term "processor" means a programmable analog and/or digital device that can store, retrieve, and process data; a computer; a workstation; a personal computer; a microprocessor; a microcontroller; a microcomputer; a central processing unit; a mainframe computer; a mini-computer; a server; a networked processor; a field programmable gate array; or any suitable processing device or apparatus.

As employed herein, the term "field programmable gate array" or "FPGA" means a semiconductor device containing programmable logic components, such as logic blocks, and programmable interconnects therebetween. For example, logic blocks can be programmed to perform the function of basic logic gates (e.g., without limitation, AND; OR; XOR; NOT) or relatively more complex combinational functions (e.g., without limitation, decoders; relatively simple mathematical functions; IP cores; central processing units). The FPGA logic blocks may also include volatile and/or non-volatile memory elements. A hierarchy of programmable interconnects may allow logic blocks to be interconnected and programmed after the FPGA is manufactured to implement any logical function.

As employed herein, the term "diverse" means composed of distinct or unlike elements or qualities. For example, an FPGA made by one vendor (e.g., without limitation, Altera Corporation) is diverse from a different FPGA made by a different vendor (e.g., without limitation, Xilinx, Inc.). However, a processor made by one vendor (e.g., an 8086 made by Intel®) is not diverse from a plug-compatible, second source processor made by a different vendor (e.g., an 8086 made by AMD®).

The disclosed concept is described in association with a vital output apparatus for outputting a vital output corresponding to occupancy of a railroad track circuit, although the disclosed concept is applicable to a wide range of output apparatus to output a vital output for a wide range of applications. For example and without limitation, in the railroad industry, vital outputs can be used to, for example, drive signal relays, control switch machines (e.g., set the direction of a switch), and drive door controls at a platform. Vital outputs can also be used to indicate state, such as, for example, track occupancy or train stoppage. More generally, vital outputs can be used in any industry or application where an output state indicates a vital condition's state, or any time an output is used to control a vital function.

Figure 1:
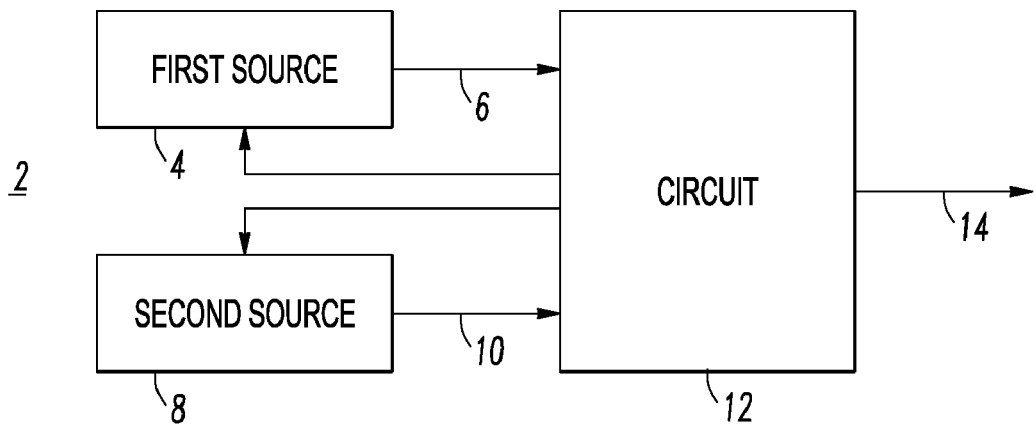
FIG. 1 is a block diagram in schematic form of an output apparatus in accordance with embodiments of the disclosed concept.

Referring to FIG. 1, an output apparatus 2 is shown. The output apparatus 2 includes a first source 4 of a first signal 6 having a first state or a different second state, a second source 8 of a second signal 10 having a first state or a different second state, and a circuit 12 structured to output a vital output 14 including a first state when the first state of the first signal 6 corresponds to the first state of the second signal 10 and, otherwise, including a different second state. At least one of the first signal 6 and the second signal 10 is a static signal. The other one of the first signal 6 having the first state and the second signal 10 having the first state is a dynamic signal. When at least one of the first signal 6 has the different second state of the first signal and the second signal 10 has the different second state of the second signal, the vital output 14 includes the different second state of the vital output.

EXAMPLE 1

The first source 4 can be diverse with respect to the second source 8.

EXAMPLE 2

The first source 4 can be a first field programmable gate array, and the second source 8 can be a different and diverse second field programmable gate array.

EXAMPLE 3

The first source 4 can be a first processor, and the second source 8 can be a second independent processor, which is synchronized to the first processor.

EXAMPLE 4

As will be discussed in greater detail, below, in connection with FIG. 2, both of the first processor and the second independent processor of Example 3 can be structured to control and monitor the circuit 12.

EXAMPLE 5

The first source 4 can be a first vital processor, and the second source 8 can be a second vital processor.

EXAMPLE 6

The first vital processor of Example 5 can be different and diverse from the second vital processor.

EXAMPLE 7

Figure 2:
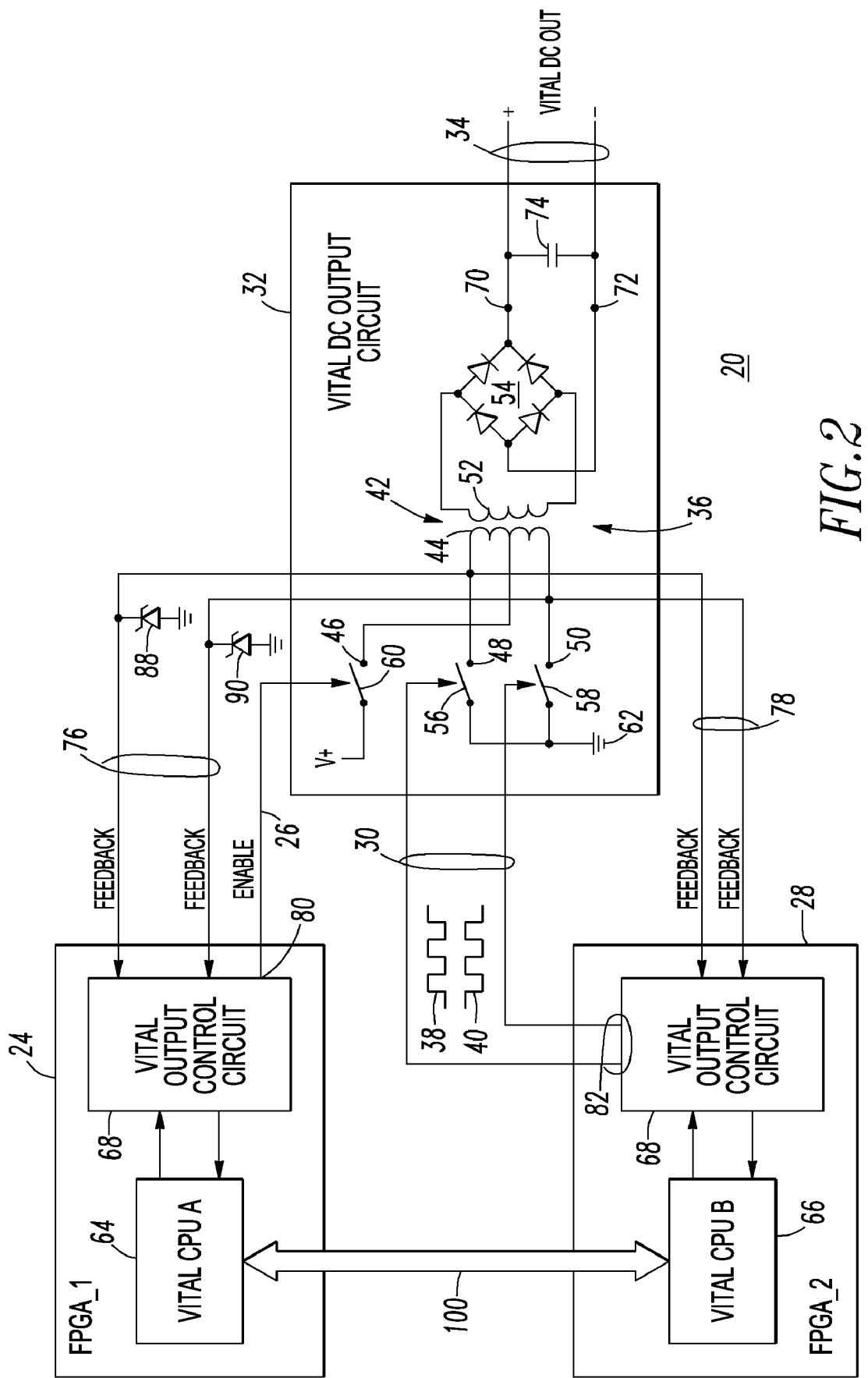
FIG. 2 is a block diagram in schematic form of an output apparatus in accordance with other embodiments of the disclosed concept.

Referring to FIG. 2, another output apparatus 20 is shown. The output apparatus 20 includes a first source 24 of a first signal 26 having a first state or a different second state, a second source 28 of a second signal 30 having a first state or a different second state, and a circuit 32 structured to output a vital output 34 including a first state when the first state of the first signal 26 corresponds to the first state of the second signal 30 and, otherwise, including a different second state. The example circuit 32 includes an alternating current to direct current converter 36 structured to output the vital output 34 including the first state as an energized direct current signal responsive to the first state of the first signal 26 being an energized direct current signal and the first state of the second signal 30 being two dynamic signals 38,40 of opposite phase.

EXAMPLE 8

The example alternating current to direct current converter 36 includes a transformer 42 having a primary winding 44 with a center tap 46 and two ends 48,50, and a secondary winding 52. The converter 36 also includes a rectifier 54 (e.g., without limitation, a full wave bridge) cooperating with the secondary winding 52. The energized direct current signal of the first state of the first signal 26 energizes the center tap 46. The two dynamic signals 38,40 of opposite phase are coupled to the two ends 48,50 of the primary winding 44 through switches 56,58, respectively, as will be described. The secondary winding 52 applies an alternating current signal to the rectifier 54 to provide the energized direct current signal of the first state of the vital output 34.

EXAMPLE 9

The example alternating current to direct current converter 36 also includes a switch 60 controlled by the energized direct current signal of the first state of the first signal 26. The switch 60 is closed responsive to such energized direct current signal to couple a direct current voltage (e.g., without limitation, V+, as shown) to the center tap 46. The switch 60 is open responsive to the different second state of the first signal 26 being a non-energized direct current signal (e.g., without limitation, common).

EXAMPLE 10

The two example switches 56,58 electrically connect the respective two ends 48,50 of the primary winding 44 to a common 62 (e.g., ground) when one of the two corresponding dynamic signals 38,40 of opposite phase is active. Hence, this couples the dynamic signals 38,40 to the respective ends 48,50 of the primary winding 44. When the energized direct current signal of the first state of the first signal 26 energizes the center tap 46, the two dynamic signals 38,40 of opposite phase alternately close the two switches 56,58 to cause the secondary winding 52 to apply the alternating current signal to the rectifier 54 to provide the energized direct current signal of the first state of the vital output 34.

EXAMPLE 11

The example alternating current to direct current converter 36 outputs the vital output 34 including the first state as an energized and isolated direct current signal responsive to the first state of the first signal 26 being an energized direct current signal and the first state of the second signal 30 being two dynamic signals 38,40 of opposite phase, and, otherwise, outputs the vital output 34 including the different second state as a non-energized and isolated direct current signal (e.g., common).

The converter 36 receives diverse control signals 26,30 to generate a vital output signal at vital output 34. The loss of either control signal 26 or 30 causes the isolated vital output 34 to de-energize, causing the vital output to turn off. By using electrical isolation of the example transformer 42, the vital output 34 is not able to self-generate the energy needed for the most restrictive output state (e.g., energized).

EXAMPLE 12

The first source 24 includes a first processor 64, the second source 28 includes a second processor 66, and both of the first and second processors 64,66 are structured to monitor (e.g., on a periodic basis) the two ends 48,50 of the primary winding 44 through a vital output control circuit 68, as will be described.

EXAMPLE 13

The rectifier 54 includes two output nodes 70,72 defining the energized direct current signal of the first state of the vital output 34, and a capacitor 74 disposed between the two output nodes 70,72. Both of the first and second processors 64,66 are structured to independently test the first and different second states of the vital output 34 through the vital output control circuit 68, as will be described.

EXAMPLE 14

One or both of the first and second processors 64,66 can be structured to cause the different second state of the vital output 34 for a predetermined time (e.g., without limitation, 2 mS; any suitable time). The capacitor 74 of the rectifier 54 can be structured to maintain the first state of the vital output 34 for greater than the predetermined time.

EXAMPLE 15

The first source 24 can be a first vital field programmable gate array (FPGA_1) including the first processor 64 (vital CPU A), and the second source 28 can be a second vital field programmable gate array (FPGA_2) including the second processor 66 (vital CPU B).

EXAMPLE 16

The first vital field programmable gate array (FPGA_1) (e.g., without limitation, marketed by Xilinx, Inc.) can be different and diverse from the second vital field programmable gate array (FPGA_2) (e.g., without limitation, marketed by Altera Corporation).

EXAMPLE 17

The first CPU (vital CPU A) (e.g., without limitation, a MicroBlaze™ CPU marketed by Xilinx, Inc.) can be different and diverse from the second CPU (vital CPU B) (e.g., without limitation, a Nios® II CPU 16 marketed by Altera Corporation).

EXAMPLE 18

The first source 24 can be a first vital field programmable gate array including a first vital CPU 64, and the second source 28 can be a second vital field programmable gate array including a second vital CPU 66.

EXAMPLE 19

The first vital CPU 64 of Example 18 can be different and diverse from the second vital CPU 66.

EXAMPLE 20

The example output apparatus 20 employs two vital processors 64,66 and a two-out-of-two safety architecture. Each vital processor 64,66 includes an independent mechanism of setting the vital output 34 to a safe off state (e.g., non-energized), which mechanism can be tested periodically. Both vital processors 64,66 monitor the state of the vital output 34 at all times through feedback signals 76,78. If the two vital processors 64,66 disagree as to the state of the vital output 34, or if the periodic testing shows that one vital processor lost its ability to shut off the vital output 34, then both vital processors 64,66 command the off state. Only one vital processor 64 or 66 needs to be successful in shutting off its respective control output 80 or 82 for the vital output 34 to be shut off.

The two ends 48,50 of the transformer primary winding 44 are switched to common 62, out of phase with each other, at a relatively high frequency by example FET switches 56,58 controlled by the vital processor 66 through the corresponding vital output control circuit 68. The transformer center tap 46 is electrically connected to V+ from a system power supply (not shown) through an example FET switch 60 controlled by the output 80 of one of the vital processors 64 through the corresponding vital output control circuit 68. The vital output circuit 32 employs two high frequency (e.g., without limitation, about 50 kHz to about 80 kHz square wave; a suitably high frequency enables a relatively smaller transformer) drive signals 38,40 within a suitable narrow bandwidth and in the correct phase (e.g., 180 degrees out of phase from each other) to generate the vital output 34. For example, the first source 24 (e.g., FPGA_1) provides an enable drive signal 26 from vital CPU A 64 through the corresponding vital output control circuit 68, and the second source 28 (e.g., FPGA_2) provides two dynamic signals 38,40 from vital CPU B 66 through the corresponding vital output control circuit 68.

The drive signals 38,40 through the FET switches 56,58 drive the transformer primary winding 44 and the oscillating signals are coupled to the secondary winding 52 where they are rectified and filtered to produce the vital DC output 34. If the control output 80 from the first vital processor 64 through the corresponding vital output control circuit 68 is shut off or if the two drive signals 38,40 are stopped, then no energy is coupled to the transformer 42 and the vital output 34 turns off. For such a specific signal to be coupled in from an external source with enough energy and in the correct phase is virtually impossible.

EXAMPLE 21

The example output apparatus 20 outputs an indication of a vital parameter (e.g., without limitation, occupancy of a railroad track circuit) to external equipment (not shown) (e.g., without limitation, a MICROLOK® II Vital Interlocking Controller; a vital relay coil). The apparatus 20 includes the circuit 68 (e.g., FPGA logic) and two vital processors 64,66 (e.g., vital CPUs) configured in a two-out-of-two composite fail-safe architecture to output a vital output voltage. Two dynamic monitor signals 76,78 from both ends 48,50 of the transformer primary winding 44 are provided to both of the vital CPUs 64,66. The vital output 34 provides a vital DC output signal, which is, for example, a nominal 12 VDC vital output signal to external equipment (not shown).

EXAMPLE 22

Figure 3:
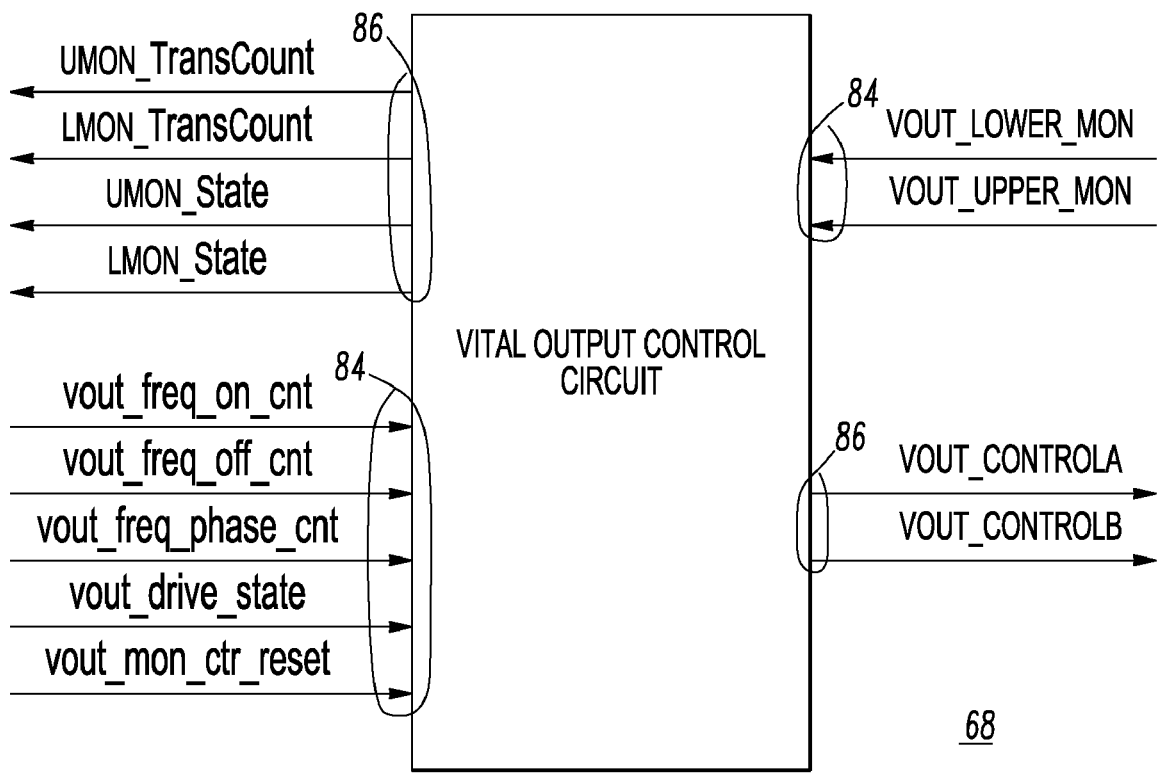
FIG. 3 is a module diagram of the vital output control circuit of FIG. 2.

FIG. 3 shows the vital output control circuit 68 of FIG. 2, which in the example embodiment, is implemented in the first source 24 (e.g., FPGA_1) and the second source 28 (e.g., FPGA_2), although it will be appreciated that this can be done in any suitable programmable or programmed hardware and/or software circuit, for interfacing the example vital DC output 34 to a vital processor such as 64 or 66. Table 1 shows the input ports 84 for the vital output control circuit 68.

TABLE 1

| Port Name | Description |
| --- | --- |
| VOUT_LOWER_MON | Vital output feedback, lower (with respect to FIG. 2) end 50 of transformer primary winding 44 |
| VOUT_UPPER_MON | Vital output feedback, upper (with respect to FIG. 2) end 48 of transformer primary winding 44 |
| vout_freq_on_cnt | On period of vital output control signal A and vital output control signal B, which set the frequency of the dynamic drive signals 38, 40 |
| vout_freq_off_cnt | Off period of vital output control signal A and vital output control signal B, which set the frequency of the dynamic drive signals 38, 40 |
| vout_freq_phase_cnt | Phase delay adjustment for vital output control signal B relative to vital output control signal A |
| vout_drive_state | For state = 1, vital CPU B/FPGA_2 generate control signal A and B as a dynamic signal with 180 phase shift and vital CPU A/FPGA_1 generate control signal A as a logic 1; for state = 0, vital CPU B/FPGA_2 generate control signals A and B as a logic 1 and vital CPU A/FPGA_1 generate control signal A as logic 0 |
| vout_mon_ctr_reset | Reset all monitor counter values to zero |

Table 2 shows the output ports 86 for the vital output control circuit 68.

TABLE 2

| Port Name | Description |
| --- | --- |
| VOUT_CONTROLA | Vital output control signal A provides the "enable" static control signal 26 from vital CPU A, and provides one of the two dynamic control signals 38, 40 from vital CPU B |
| VOUT_CONTROLB | Vital output control signal B is unused on vital CPU A, and provides the other one of the two dynamic control signals 38, 40 from vital CPU B. |
| UMON_TransCount | Provides the count of the number of rising edges sensed at VOUT_UPPER_MON |
| LMON_TransCount | Provides the count of the number of rising edges sensed at VOUT_LOWER_MON |
| UMON_State | Provides the current logic level state of VOUT_UPPER_MON |
| LMON_State | Provides the current logic level state of VOUT_LOWER_MON |

Both vital processors 64,66 participate in testing the vital output circuit 32 when it is in the on state. In a coordinated effort, the vital processors 64,66 momentarily interrupt their respective output 80,82 from the corresponding vital output control circuit 68 and monitor changes in the transformer 42. The output capacitor 74 is able to maintain the state of the vital output 34 during these brief tests.

If either vital processor 64 or 66 looses control of its respective output 80 or 82 from the corresponding vital output control circuit 68, due to a hardware and/or software failure, the condition is detected by the other vital processor through the corresponding vital output control circuit 68 which then shuts down its respective control signal 26 or 38,40.

Both vital processors 64,66 monitor the dynamic behavior of both primary winding ends 48,50 through the corresponding vital output control circuit 68. The transformer secondary winding 52 feeds the rectifier 54 and the filter capacitor 74. In this manner, the presence of alternating current in the primary winding 52 will result in a DC voltage at the external vital output 34. Conversely, the absence of alternating current in the primary winding 52 ensures that the external vital output 34 is in its off state. For periodic shut-off tests, the converter 36 can be interrupted for a predetermined time (e.g., without limitation, approximately 2 ms; any suitable time) without changing the energized state of the vital output 34. For example, the time the vital output 34 can be interrupted is a function of the operating frequency of the switches 56,58, the value of the capacitor 74, and the load (not shown) driven by the vital output 34. As a non-limiting example, for an operating frequency of about 80 kHz, a 1 uF capacitor and an 800Ω load (e.g., typical of certain vital relays), the vital output 34 can be maintained for about 5 mS (e.g., which is preferably de-rated to limit the interruption to about 2 mS). Regardless, no output is possible in the event that either one of the vital processors 64,66 (or the corresponding FPGA_1 or FPGA_2) is in a static state.

The relationship between the controls signals 26,38,40 and the feedback signals 76,78 is summarized in Table 3, below. The first two rows are self test cases performed by programmable hardware logic (not shown) of the circuit 68. The programmable hardware logic corresponding to vital CPU A 64 sets the control signal 26 (A) as either logic 1 or logic 0. The programmable hardware logic corresponding to vital CPU B 66 generates two controls signals 38,40 (A and B) with either a 180 phase shift or with a common logic 1 ON state. Both circuits 68 of the vital CPUs A and B 64,66 check the current voltage level (e.g., digital input, since zener diodes 88,90 force the analog signal to a suitable digital level) of the vital output feedback, and count the rising edges from transformer primary winding lower (with respect to FIG. 2) end 50 and transformer primary winding upper (with respect to FIG. 2) end 48. The vital output voltage is only present on the vital output 34 for the case of the third row of Table 3. The fourth row is the normal vital output off state, when both vital processors 64,66 have determined that the vital output 34 should be in the OFF state.

TABLE 3

| Control Signals 26 and 38, 40 | | Feedback Signals | |
|---|---|---|---|
| CPU A | CPU B | VOUT_UPPER_MON | VOUT_LOWER_MON |
| 1 | 1 | 1 | 1 |
| 0 | 80 kHz | 0 | 0 |
| 1 | 80 kHz | 80 kHz | 80 kHz |
| 0 | 1 | 0 | 0 |

The example vital processors 64,66 include a cyclic operating system (not shown) that cyclically calls several high level software tasks (not shown) to perform various operations (e.g., without limitation, one of these software tasks processes track signal data (not shown) to determine when a railroad track (not shown) is occupied; this function then provides input data to a vital output software task, which sets the output signals 26 or 38,40 from the vital output control circuit 68 to the correct state; for the vital processor 64, this is simply turning on the supply voltage V+ through FET switch 60; for the other vital processor 66, this clocks the two FET switches 56,58 at a predetermined timing). The various software tasks are executed by the vital processors 64,66.

For example, the vital output software task running on the vital processors 64,66 sets the vital output 34 indicating occupancy (e.g., without limitation, occupancy of a railroad track circuit). This vital output 34 achieves vitality since: (1) its state is detectable by both vital processors 64,66 through the corresponding vital output control circuit 68; (2) both vital processors 64,66 can independently clear the vital output 34 to a safe state through the corresponding vital output control circuit 68; (3) both vital processors 64,66 need to agree in their decision to set the vital output 34 to the more permissive ON state through the corresponding vital output control circuit 68; (4) the vital output control circuit 68 that clears and monitors the vital output 34 is continually tested, and the vital output 34 is used such that the OFF state (e.g., de-energized) is the safer of the two possible states; (5) diverse mechanisms are employed for the two vital processors 64,66 to set the vital output 34 to the energized state—vital processor 64 (CPU A) provides a simple discrete output 80 through the corresponding vital output control circuit 68 while vital processor 66 (CPU B) provides a frequency output 82 through the corresponding vital output control circuit 68 employed to energize the vital output 34, and the software control of vital processor 64 (CPU A) employs a single vital output drive bit state, while the software control of vital processor 66 (CPU B) employs a phase count value, frequency-on counter value and frequency-off counter value in addition to the vital output drive bit state; and (6) the testing of the outputs 80,82 is coordinated such that both vital processors 64,66 agree on which vital processor sets the test state and both vital processors 64,66 monitor the results.

The vital output software task sets up the vital processor 66 (CPU B) phase count value, frequency-on counter value and frequency-off counter value to suitable constants at initialization. These values are input from system configuration data stored in flash memory (not shown). After the hardware is initialized, both vital processors 64,66 simply maintain a single vital output drive bit to control the state of the vital output 34 during operation.

Monitors are provided by the vital output control circuit 68 and are visible by both vital processors 64,66 for detecting the state of the vital output 34. The monitors include an upper monitor state, a lower monitor state, an upper monitor counter value and a lower monitor counter value. Here, the terms upper and lower refer to the upper and lower (with respect to FIG. 2) ends 48,50 of the primary winding 44. All monitor signals are available to both vital processors 64,66 as inputs through the corresponding vital output control circuit 68. The monitor signals are read every software cycle to validate that the vital output 34 is in the desired state which was set.

When the cyclic operating system calls the vital output software task, the output 80,82 is delivered and diagnostics are executed. Periodically, the vital output software task tests the vital output 34 while it is in the energized state to check that each vital processor 64,66 independently has the ability to de-energize the vital output 34 through the corresponding vital output control circuit 68 into the safe state.

Table 4 shows the possible control combinations with the expected monitor results.

TABLE 4

| | Control States | | Monitor States | | |
|---|---|---|---|---|---|
| Operation | CPU A Output Control 80 | CPU B Output Control 82 | Upper Monitor State | Lower Monitor State | Upper and Lower Monitor Counters |
| Output ON (energized) | 1 | 1 | N/A (switching) | N/A (switching) | Counting transitions |
| Output OFF (de-energized) | 0 | 0 | 1 | 1 | Not counting |
| Test case 1 (CPU A off) | 0 | 1 | 0 | 0 | Not counting |
| Test case 2 | 1 | 0 | 1 | 1 | Not |

TABLE 4-continued

|  | Control States | | Monitor States | | |
|---|---|---|---|---|---|
| Operation | CPU A Output Control 80 | CPU B Output Control 82 | Upper Monitor State | Lower Monitor State | Upper and Lower Monitor Counters |
| (CPU B off) |  |  |  |  | counting |

In test case 1, vital processor 64 (CPU A) turn offs the output 80 of the corresponding vital control output circuit 68 causing the monitors to read zero with no counts being recorded. However, if FPGA_1 is static with its enable drive signal 26 stuck on, then there will be switching and counts recorded as in the first row in this table. Hence, the error condition is detectable by vital processor 66 (CPU B).

Figure 4:
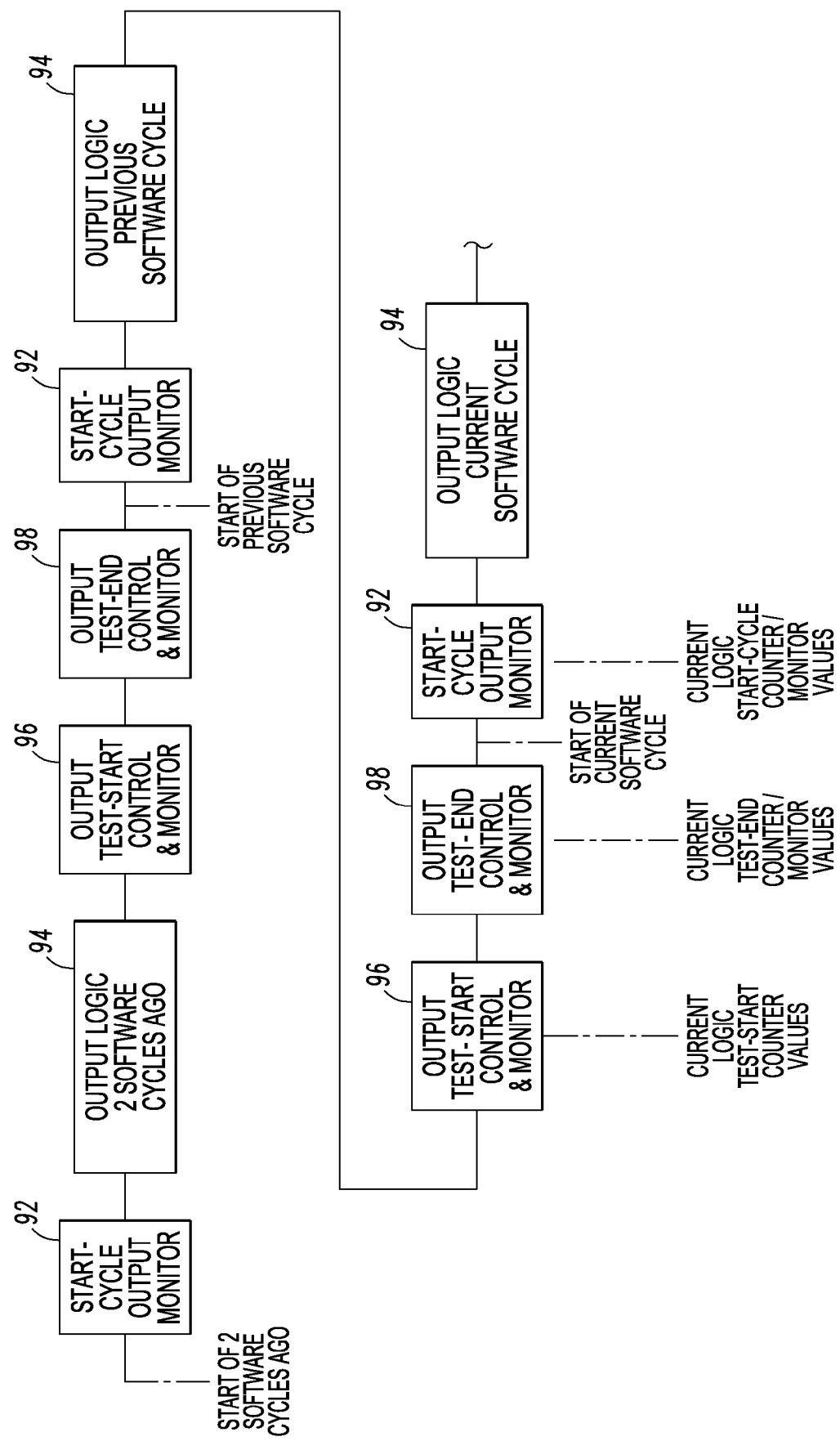
FIG. 4 is a timing diagram of software cycles including output monitoring, output control and output test for the vital output control circuit of FIG. 2.

The processing of the vital output control monitoring and testing is implemented by four example tasks, which can be spread out during the software cycle: (1) start-cycle output monitor 92; (2) vital output logic 94; (3) output test-start control/monitor 96; and (4) output test-end control/monitor 98, as shown in FIG. 4. This shows software cycles including output monitoring, output control and output test for the vital output control circuit 68 of FIG. 2.

For the start-cycle output monitor task 92, at the start of the software cycle, the vital output software task stores all the monitor states and counter values. This is done at the start of the cycle, which is synchronized between the two vital processors 64,66 through interface 100 (FIG. 2), such that the elapsed time between this read for the previous and current cycles is consistent and equal to the cycle time. This can be done with a suitable driver (not shown).

The output test-start control/monitor task 96 is executed at a point in the software cycle after the vital output logic task 94 has determined the system vital output state and if an output test is going to be performed by the corresponding vital processor 64,66. First, the software stores the output monitor counters, sets the output control signal to the system state (e.g., without limitation, occupied; unoccupied) or sets the system to the test state if it is a test cycle. Then, the software enables a single 2 ms timer interrupt. The driver (not shown) that performs this function is called at least 2.5 ms before the end of the software cycle such that the test is completed at least 0.5 ms before the end of the software cycle.

The 2 ms interrupt enabled by the output test-start control/monitor task 96 has a handler designated as the output test-end control/monitor task 98. This handler clears and disables the interrupt each software cycle. In the interrupt handler, the software stores the output monitor states and counters values, sets the vital output control to the system vital output state, and then returns from the interrupt handler. This is completed at least 500 μs before the end of the software cycle which is at least 500 μs before the monitors are read at the start of the cycle. A typical cycle is, for example and without limitation, 20 milliseconds.

The vital output logic task 94 determines the output state from the system input (e.g., without limitation, input from logic performed by other system tasks; input from tasks that process a track signal to determine the presence of a train (occupancy)). The vital output logic task 94 sets the appropriate state and verifies that this state is correct. The vital output software task 94 clears the vital output state when occupancy state data provided by other system tasks indicates occupancy, and sets the vital output state to be energized when such occupancy state data indicates unoccupied.

The vital output logic task 94 also determines when an output test cycle is to be performed. Hence, the vital output logic task 94 determines what the state should be (the logically desired state based upon system logic, or a test state). The system runs such that vital processor 64 (CPU A) and vital processor 66 (CPU B) alternate tests once each second (e.g., in 2 seconds both vital CPU A and vital CPU B have run their tests). Based on synchronized software cycle counters, each vital processor 64,66 determines which software cycle it performs its test, and which cycle the opposite vital processor performs its test. The circuit 68 ensures that both vital processors 64,66 do not run their test on the same software cycles (e.g., the tests can be spread out or could be run on adjacent cycles).

On a cycle in which one of the vital processors 64,66 performs its test, the control value is set to turn off the vital output 34. If the system output state is previously off, then the test results in no change. The control signal used by the output test-start control/monitor task 96 is set to the off value. This results in the vital output control being turned off for 2 ms before the output test-end control/monitor task 98 sets the vital output 34 back to the energized state.

The circuit 68 performs all evaluations of the monitor data to detect that the vital output 34 is operating correctly and is in the correct state. The circuit 68 calculates the cycle counter value as being the total number of counts seen in a cycle. The hardware counter is cleared on each read, so the circuit 68 calculates the cycle counter value as being the start-cycle counter value plus the start-test monitor counter value plus the end-test monitor counter value. Because the hardware counter is cleared by reading the value at the start of the test, the circuit 68 calculates the test counter value as simply being equal to the end-test hardware counter value. For all output evaluations, both upper and lower monitor states and counters are stored and evaluated against the same values. The circuit 68 tests for correct output operation based on the control states.

Table 5 shows the output checks performed by the circuit 68 under the different control circumstances:

TABLE 5

| System State | | | | Tested Results | | | |
|---|---|---|---|---|---|---|---|
| Previous software cycle output state | Two software cycles ago output state | Local CPU previous software cycle test state | Opposite CPU previous software cycle test state | Start-cycle mons | Cycle counters | Test-end mons | Test counters |
| 0 | 0 | X | X | 1 | Zero | 1 | Zero |
| 1 | 1 | 0 | 0 | X | CycleOn | X | TestOn |
| 1 | 1 | 1 | 0 | X | CycleTest | TMon | TestOff |
| 1 | 1 | 0 | 1 | X | CycleTest | X | X |
| 1 | 0 | 0 | 0 | X | X | X | X |
| 1 | 0 | 1 | 0 | X | X | X | Zero |
| 1 | 0 | 0 | 1 | X | X | X | X |
| 0 | 1 | X | X | 1 | X | X | TestOff | wherein:
  mons=monitors;
  X=don't care;
  0=off or low;
  1=on or high;
  Zero: Counter≦5 (this should nominally be 0, but a suitable tolerance for errors is provided);

CycleOn: Counter=(Cycle Time)*(Counter Frequency)+/−10%;

TestOn: Counter=(2 ms test time)*(Counter Frequency)+/−2%;

CycleTest: Counter=[(Cycle Time)−(2 ms test time)]* (Counter Frequency)+/−10%;

TestOff: Counter≦(500 μs maximum turn off time)* (Counter Frequency); and

TMon: Monitor=0 if CPU A, Monitor=1 if CPU B.

When either the upper or lower monitor or counter values do not match the expected values of Table 5, the vital output control circuit 68 declares an output failure and sets its output 80 or 82 to turn the vital output 34 off and keep it in the off state until the corresponding vital processor 64,66 is reset. The output failure is indicated to the other vital processor such that the validation logic of task 94 will set its output state to the safe off state as well.

In FIG. 4, starting, for example, at the first instance of the vital output logic task 94, the output apparatus 20 receives the desired output state from other system logic (e.g., without limitation, logic that determines the occupancy state). The vital output logic task 94 also keeps track of when it is time to conduct tests on the vital output control circuit 68 and the vital DC output circuit 32. The vital output logic task 94 then passes a state, either a test state or a desired output state, to the output test-start control/monitor task 96, which sets the vital output 34 to that state. At that time, the output test-start control/monitor task 96 begins to collect data from the monitor feedbacks from 76 or 78. This data is either steady state data or counts from the switching of the switches 56,58. Two milliseconds later, the output test-end control/monitor task 98 re-reads the same data and the vital output 34 is then placed in the desired output state, which is the logically desired state based upon system logic. On the other hand, if a test is not scheduled, then the desired output would have been set by the output test-start control/monitor task 96. The start-cycle output monitor task 92 of the next software cycle (e.g., without limitation, 20 mS) processes the test data collected during the previous cycle (at 96 and 98), if a test was conducted.

The two monitoring points 48,50 (FIG. 2) drive logic-level inputs to the vital output control circuit 68, which need not employ A/D measurements. Under normal conditions, the signals 76,78 at the two monitoring points are square waves switching between about 0 V and 30 V; the zener diodes 88,90 (e.g., without limitation, 3.3 V) clip off the top 90% of those signals 76,78. The use of the vital output control circuit 68 to count pulses during the test interval assures that the two monitoring points are not latched in a false "good" state.

The disclosed concept provides a mechanism for two vital processors 4,6 or 64,66 to vitally control one vital output 14,34.

The disclosed apparatus 20 has a relatively low cost, a relatively low component count, and employs FPGAs and a relatively small transformer 42 to provide a relatively small circuit board footprint (not shown). The use of an FPGA interface circuit 68 relieves the vital processors 64,66 of much signal processing, while still placing the final logic and control within the vital processors.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. An output apparatus comprising:
a first source of a first signal having a first state or a different second state;
a second source of a second signal having a first state or a different second state; and
a circuit structured to output a vital output including a first state when the first state of the first signal corresponds to the first state of the second signal and, otherwise, including a different second state,
wherein at least one of the first signal and the second signal is a static signal,
wherein the other one of the first signal and the second signal having the first state is a dynamic signal,
wherein when at least one of the first signal has the different second state of the first signal and the second signal has the different second state of the second signal, the vital output includes the different second state of the vital output,
wherein said circuit comprises an alternating current to direct current converter structured to output the vital output including the first state as an energized direct current signal responsive to the first state of the first signal being an energized direct current signal and the first state of the second signal being two dynamic signals of opposite phase,
wherein said alternating current to direct current converter comprises a transformer including a primary winding having a center tap and two ends, and a secondary winding, and a rectifier cooperating with the secondary winding,
wherein the energized direct current signal of the first state of the first signal is structured to energize the center tap,
wherein the two dynamic signals of opposite phase are coupled to the two ends of the primary winding,
wherein said secondary winding applies an alternating current signal to said rectifier to provide the energized direct current signal of the first state of the vital output,
wherein the first source comprises a first processor,
wherein the second source comprises a second processor, and
wherein both of the first and second processors monitor the two ends of the primary winding.

2. The output apparatus of claim 1 wherein said alternating current to direct current converter further comprises a switch controlled by the energized direct current signal of the first state of the first signal, said switch being closed responsive to the last said energized direct current signal to couple a direct current voltage to the center tap, said switch being open responsive to the different second state of the first signal being a non-energized direct current signal.

3. The output apparatus of claim 1 wherein said alternating current to direct current converter further comprises two switches structured to electrically connect the two ends of the primary winding to a common; wherein the two dynamic signals of opposite phase are coupled to the two ends of the primary winding; and wherein when the energized direct current signal of the first state of the first signal energizes the center tap, the two dynamic signals of opposite phase alternately close the two switches to cause the secondary winding to apply the alternating current signal to said rectifier to provide the energized direct current signal of the first state of the vital output.

4. The output apparatus of claim 1 wherein the rectifier includes two output nodes defining the energized direct current signal of the first state of the vital output and a capacitor disposed between the two output nodes; and wherein both of the first and second processors are structured to independently test the first and different second states of the vital output.

5. The output apparatus of claim 4 wherein one of the first and second processors is structured to cause the different second state of the vital output for a predetermined time; and wherein the capacitor of the rectifier is structured to maintain the first state of the vital output for greater than the predetermined time.

6. The output apparatus of claim 1 wherein the first source is diverse with respect to the second source.

7. The output apparatus of claim 1 wherein the first source is a first field programmable gate array; and wherein the second source is a different and diverse second field programmable gate array.

8. The output apparatus of claim 1 wherein said circuit comprises an alternating current to direct current converter structured to output the vital output including the first state as an energized and isolated direct current signal responsive to the first state of the first signal being an energized direct current signal and the first state of the second signal being two dynamic signals of opposite phase, and, otherwise, to output the vital output including the different second state as a non-energized and isolated direct current signal.

9. An output apparatus comprising:
a first source of a first signal having a first state or a different second state;
a second source of a second signal having a first state or a different second state; and
a circuit structured to output a vital output including a first state when the first state of the first signal corresponds to the first state of the second signal and, otherwise, including a different second state,
wherein at least one of the first signal and the second signal is a static signal,
wherein the other one of the first signal and the second signal having the first state is a dynamic signal,
wherein when at least one of the first signal has the different second state of the first signal and the second signal has the different second state of the second signal, the vital output includes the different second state of the vital output,
wherein said first source is a first processor having a plurality of first software cycles; wherein said second source is a second independent processor having a plurality of second software cycles, which are synchronized to the first software cycles of said first processor,
wherein both of said first processor and said second independent processor are structured to control and monitor said circuit, and
wherein both of said first processor and said second independent processor are structured to test said circuit on different ones of the synchronized first and second software cycles.

10. The output apparatus of claim 1 wherein said first processor is a first vital processor; and wherein said second processor is a second vital processor.

11. The output apparatus of claim 10 wherein said first vital processor is different and diverse from said second vital processor.

12. The output apparatus of claim 1 wherein said first processor is a first vital field programmable gate array including a first CPU; and wherein said second processor is a second vital field programmable gate array including a second CPU.

13. The output apparatus of claim 12 wherein said first vital field programmable gate array is different and diverse from said second vital field programmable gate array.

14. The output apparatus of claim 13 wherein said first CPU is different and diverse from said second CPU.

15. The output apparatus of claim 1 wherein said first processor is a first vital field programmable gate array including a first vital CPU; and wherein said second processor is a second vital field programmable gate array including a second vital CPU.

16. The output apparatus of claim 15 wherein said first vital CPU is different and diverse from said second vital CPU.

* * * * *

UNITED STATES PATENT AND TRADEMARK OFFICE
CERTIFICATE OF CORRECTION

PATENT NO. : 8,289,734 B2  
APPLICATION NO. : 12/579446  
DATED : October 16, 2012  
INVENTOR(S) : James P. Brown et al.

Page 1 of 2

It is certified that error appears in the above-identified patent and that said Letters Patent is hereby corrected as shown below:

Column 12, TABLE 5,

TABLE 5

| System State | | | | Tested Results | | | |
|---|---|---|---|---|---|---|---|
| Previous software cycle output state | Two software cycles ago output state | Local CPU previous software cycle test state | Opposite CPU previous software cycle test state | Start-cycle mons | Cycle counters | Test-end mons | Test counters |
| 0 | 0 | X | X | 1 | Zero | 1 | Zero |
| 1 | 1 | 0 | 0 | X | CycleOn | X | TestOn |
| 1 | 1 | 1 | 0 | X | CycleTest | TMon | TestOff |
| 1 | 1 | 0 | 1 | X | CycleTest | X | X |
| 1 | 0 | 0 | 0 | X | X | X | X |
| 1 | 0 | 1 | 0 | X | X | X | Zero |
| 1 | 0 | 0 | 1 | X | X | X | X |
| 0 | 1 | X | X | 1 | X | X | TestOff |

" "

should read

Signed and Sealed this  
Second Day of April, 2013

Teresa Stanek Rea  
*Acting Director of the United States Patent and Trademark Office*

Table 5

| System State | | | | Tested Results | | | |
|---|---|---|---|---|---|---|---|
| Previous software cycle output state | Two software cycles ago output state | Local CPU previous software cycle test state | Opposite CPU previous software cycle test state | Start-cycle mons | Cycle counters | Test-end mons | Test counters |
| 0 | 0 | X | X | 1 | Zero | 1 | Zero |
| 1 | 1 | 0 | 0 | X | CycleOn | X | TestOn |
| 1 | 1 | 1 | 0 | X | CycleTest | TMon | TestOff |
| 1 | 1 | 0 | 1 | X | CycleTest | X | X |
| 1 | 0 | 0 | 0 | X | X | X | X |
| 1 | 0 | 1 | 0 | X | X | X | Zero |
| 1 | 0 | 0 | 1 | X | X | X | X |
| 0 | 1 | X | X | 1 | X | X | TestOff |